Jan. 17, 1939. W. M. THOMPSON 2,143,927
GUARD FOR MANUAL AND LIKE DIGITS
Filed Jan. 22, 1937

Inventor;
William Moore Thompson
By: Parkinson & Lane, Atty.

Patented Jan. 17, 1939

2,143,927

UNITED STATES PATENT OFFICE 2,143,927

GUARD FOR MANUAL AND LIKE DIGITS

William Moore Thompson, Chicago, Ill.

Application January 22, 1937, Serial No. 121,750

1 Claim. (Cl. 128—133).

The present invention relates to guard means for manual and like digits and has reference more particularly to means for discouraging or curing the habit of a person, especially a child, addicted to sucking one or more of the digits of the hand, or even of the feet, such as a thumb, or finger, one or more, or a toe or more.

A young child as a rule sucks its thumb, but many suck one or more of the fingers with or without the thumb. The child obtains considerable satisfaction in sucking his thumb or finger etc. because of his ability to maintain a vacuum, and hence the reason for continuing the habit. If that vacuum can be broken or destroyed or even prevented, the satisfaction is annulled and the child soon loses the desire to suck his thumb, finger, etc. and hence the habit dwindles and finally is lost or forgotten entirely.

There are cases where anti-sucking devices have been designed to produce an undesirable feeling, such as projections which would hurt the child and tend to make the child desist and shrink from repeating and thus supposedly making the child discontinue the habit, but the projections mentioned often injure or damage the mucous membrane of the mouth and so such devices are not regarded as so desirable.

The present invention comprehends the provision of a novel device which avoids the disadvantages mentioned above and which will very efficaciously prevent the creating and the maintaining of a vacuum regardless of how hard and persistently the child may press on the device. It is impossible for him to obtain any satisfaction from sucking because he cannot produce and hold a vacuum.

Other advantages, capabilities, objects, features, or the like, are comprehended by the invention as will later appear and as are inherently possessed by the invention.

Referring to the drawing.

Figure 1:
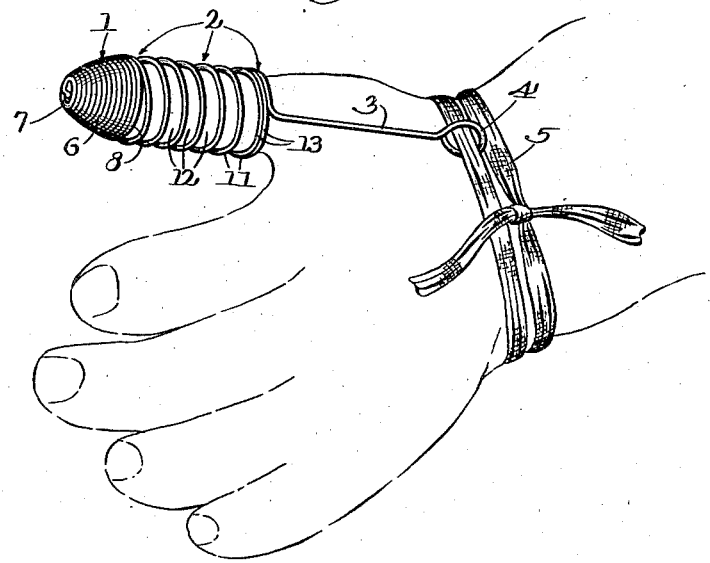
Fig. 1 is a perspective view of a hand and the invention applied to the first digit thereof, as the thumb.
Figure 2:
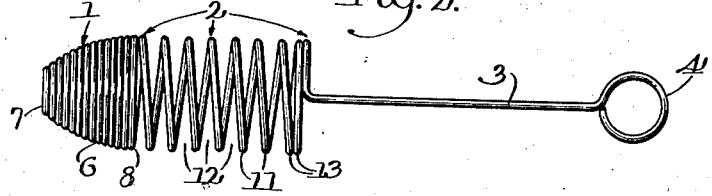
Fig. 2 is a plan view of the novel device.
Figure 3:
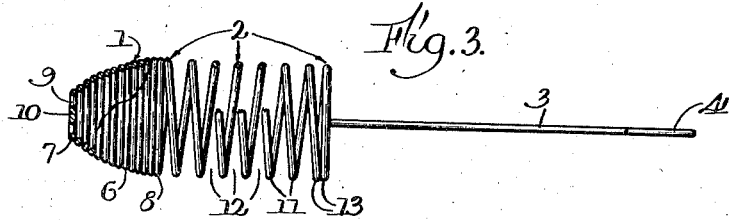
Fig. 3 is a side or elevational view of the same with parts shown broken away; and, Fig. 4 is an end view thereof.
Figure 4:
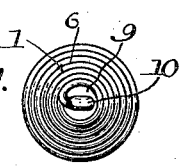

Referring more in detail to the drawing, the embodiment selected to illustrate the invention comprises a single elongated element in the nature of a filament or wire convoluted for the major portion of its length so as to provide a thimble portion 1 and an encircling portion 2, the latter having a substantially straight resilient extension or segment 3 having at its end or terminal an eye 4 through which the wrist cord or band 5 passes, the latter being suitably tied as shown. The thimble and encircling portion form a hollow member in which the digit may be freely contained without any binding upon the digit, the device being held in place by the attaching means above described.

The thimble portion 1 is preferably conoidal in form or shape and is composed of closely related convolutions 6 of various diameters the convolution 7 at the tip or apical part being of the smaller diameter and the convolution 8 at the base of the conoid being of the larger diameter. At the apical part the thimble is provided with an opening 9 through which air may be drawn to prevent the creation and maintenance of any vacuum within the member. In order that the child may not insert the end of his tongue in this opening or injure his tongue, it is preferable that the end of the wire extend across the opening 9 to provide or afford a barrier or the like 10, which, if desired, may be widened as by flattening to reduce the effective size of the opening 10. While the convolutions 6 are so coiled as to be disposed close together they are not so close as to prevent passage of air among them in aid of preventing the formation of a vacuum.

Some of the objects for disposing the coils 6 in close proximity is to present a generally smooth surface area, to prevent the catching or engagement of the thimble portion with other objects as the child's hand moves about, and to give the thimble portion a substantial stiffness of form.

The encircling portion 2 comprises a series of convolutions 11 in spaced relation to provide among them a plurality of openings 12 of ample magnitude as to provide for ready and free passage of air as the child tends to create a vacuum within the thimble chamber around the contained digit. If the child should apply his mouth laterally or to the side of the device he can only cover a part of the coils and any sucking effort on his part regardless of how hard and persistently he may suck will be completely destroyed by the ready and facile entry of air through the openings 12 on the other side of the coils 11.

At the end of the series 11 two or more convolutions 13 may be disposed in close relation to form a sort of ring or band defining the inner limit of the device, and strengthening it as also affording sufficient breadth of contact as not to harm or hurt the child when bending the digit. The coils 11 serve also as a connection between the rings and the thimble besides permitting perfectly normal movement of the digit because of the resiliency or flexibility of the convolutions 11.

The extension 3 serves as a connection between the ring 13 and the cord or ribbon 5, the latter being passed through the eye 4 as desired and bound around the wrist with one or more convolutions as desired, and tied or otherwise secured so that the child cannot readily disengage it as also making it impossible for the child to remove the device from the digit upon which the device is applied. The extension 3 preferably is resilient or flexible so that it may bend to conform to the contour of the portion of the hand it overlies at all times without imposing any unnecessary or harmful stress or strain, as also to bend in conformity with the movement of the hand.

The wire is preferably of a material such as German silver, or silver, or gold, or stainless steel, or similar substance, which will not corrode, tarnish or otherwise be effected by the saliva and other fluids of the mouth, and which also will not readily pick up dirt, etc.

By using a wire or filament of rounded cross-section there is no harmful or injurious projection. As shown the cross-sectional area of the wire is circular but it will be understood that other forms of cross-sectional area are comprehended by the invention, such as oval, elliptical, etc., whereby there is always a general roundness without any projecting part.

While I have herein described and on the drawing shown an illustrative embodiment of the invention, it is to be understood that the invention is not limited thereto but comprehends other constructions, details, arrangements of parts, features, or the like without departing from the spirit of the invention.

Having thus disclosed the invention, I claim:

In an anti-sucking device for a digit of a child's hand and the like, the combination of a tapered thimble portion formed of closely coiled small resiliently flexible wire, the adjacent coils substantially touching each other, the forward end of said thimble portion having an opening leading to the hollow interior thereof, the free end of the forwardmost coil of the thimble portion being bent to extend laterally into said opening to partially obstruct the passage therethrough to prevent entrance of the child's tongue, the wire of said coils at the rear end of the thimble portion being continued rearwardly in a number of spaced apart coils of substantially equal diameter to form a supporting portion, said diameter being substantially equal to that of the largest coil at the rear end of the thimble portion, said wire at the rear end of the supporting portion being formed into a ring, said wire extending rearwardly from said ring to form a resilient connecting portion having at its rear end a loop so arranged as to receive a tape fastened around the wrist of the wearer, said thimble portion, supporting portion, ring, connecting portion and loop all being formed from a single length of resilient non-corrodible wire of small diameter.

WILLIAM MOORE THOMPSON.